United States Patent [19]

Bronstert

[11] Patent Number: 4,816,520
[45] Date of Patent: Mar. 28, 1989

[54] TERMINALLY FUNCTIONALIZED POLYMERS AND PREPARATION THEREOF

[75] Inventor: Klaus Bronstert, Carlsberg, Fed. Rep. of Germany

[73] Assignee: Basf Aktiengesellschaft, Ludwigshafen, Fed. Rep. of Germany

[21] Appl. No.: 119,492

[22] Filed: Nov. 12, 1987

[30] Foreign Application Priority Data

Nov. 20, 1986 [DE] Fed. Rep. of Germany ....... 3639569

[51] Int. Cl.$^4$ .......................... C08F 8/30; C08F 8/46
[52] U.S. Cl. .................................. 525/285; 525/298; 525/301; 525/374; 525/375; 525/376; 525/359.2; 525/259
[58] Field of Search .............. 525/374, 375, 376, 285, 525/298, 301, 359.2

[56] References Cited

U.S. PATENT DOCUMENTS

| | | | |
|---|---|---|---|
| 3,178,398 | 4/1965 | Strobel et al. | 525/376 |
| 3,786,116 | 1/1974 | Milkovich et al. | |
| 4,229,308 | 10/1980 | Brulet et al. | 525/375 |
| 4,399,260 | 8/1983 | Carson | 525/375 |
| 4,544,711 | 10/1985 | Mancinelli | 525/348 |
| 4,647,625 | 3/1987 | Aonuma et al. | 525/375 |
| 4,753,991 | 6/1988 | Bronstert | 525/375 |

FOREIGN PATENT DOCUMENTS 1444680 8/1976 United Kingdom .

*Primary Examiner*—Wilbert J. Briggs, Sr.
*Attorney, Agent, or Firm*—Keil & Weinkauf

[57] ABSTRACT

The terminally functionalized polymers are prepared from living polymers obtained by anionic polymerization of olefinically unsaturated monomers by reacting the living polymers first with capping reagents comprising nitrogen compounds of the general formulae I to VII:

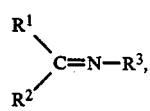

(I)

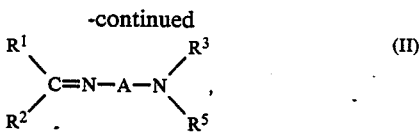

(II)

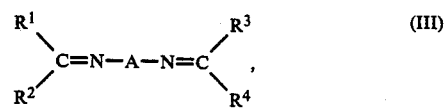

(III)

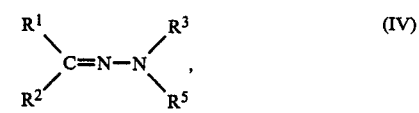

(IV)

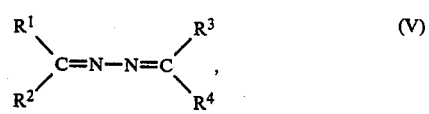

(V)

where $R^1$ and $R^4$ are each H, alkyl cycloalkyl or aryl, $R^2$, $R^3$ and $R^5$ are each alkyl, cycloalkyl or aryl and A is a substituted or unsubstituted bridge which, in addition to the C members, can also contain N or O members and

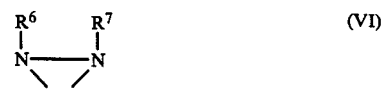
(VI)

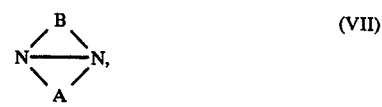

(VII)

where $R^6$ and $R^7$ are each alkyl or aryl, A is a single-membered substituted or unsubstituted carbon bridge and B is a 2- to 12-membered bridge of which at least those members adjacent to the nitrogen atom comprise —C($R^8$, $R^9$) radicals, where $R^8$ and $R^9$ can be identical or different and are H, alkyl, cycloalkyl or aryl, and the nonadjacent members can be not only —C($R^8$, $R^9$) radicals but also ethyl or N-alkyl or N-aryl-imino groups, and the polymer obtained is then made to react with a terminating agent which contains halogen or acid anhydride groups, suitable capping reagents being compounds of the class of 1,5-diazabicyclo[3,1,0]hexane and suitable terminating agents being chloromethylstyrenes, acryloyl chloride, methacryloyl chloride, epichlorohydrin, acrylic anhydride, methacrylic anhydride or maleic anhydride.

3 Claims, No Drawings

TERMINALLY FUNCTIONALIZED POLYMERS AND PREPARATION THEREOF

The present invention relates to terminally functionalized polymers and to a process for preparing same.

The preparation of terminally functionalized polymers is described in U.S. Pat. Nos. 3,786,116 and 4,544,711.

In U.S. Pat. No. 3,786,116, styrene or butadiene is anionically polymerized, and subsequently the living polymer, if desired after reaction with ethylene oxide, is terminated with a halogen-containing reagent which contains polymerizable double bonds or other end groups. In this termination reaction, alkali metal halide is eliminated to leave polymers having polymerizable end groups.

Of the two variants described, the first comprises the termination of polystyrene lithium with the halogen-containing reagent which introduces the polymerizable end group, for example an epoxy or styryl group. However, the polystyryl lithium reacts with the polymerizable groups of the reagent, as well as with the halogen group, leading to polymer dimerization and other undesirable secondary reactions.

In the second variant, the polystyryl carbanion is first capped with an alkylene oxide to give an alkoxide anion and is only then reacted with the halogen-containing compound. However, this process has the disadvantage of proceeding via a less reactive intermediate which is not as readily convertible into the end product.

In U.S. Pat. No. 4,544,711, the polystyryl anion is capped not with ethylene oxide but with ethylene sulfide before reaction with the halogen-containing reagent. An intermediate in this reaction is the lithium salt of a thiol anion of the polymer. However, with this process it is a disadvantage that the reaction with ethylene sulfide gives rise to substantial amounts of coupled polymeric byproducts.

It is an object of the present invention to avoid the abovementioned disadvantages and to arrive at polymers which contain no by-products.

We have found that this object is achieved if the initial reaction is not with ethylene oxide or sulfide but with a capping agent which leads to lithium amides of polymers which contain at least one amino group at the end of the chain. Suitable reagents are proposed in EP-A-No. 211,395 and U.S. Ser. No. 030,481. The terminating reagent is then added to produce a terminally functionalized polymer which contains the desired polymerizable groups in yields of more than 80% by weight.

Terminally functionalized polymers, also referred to as macromonomers, of particular interest consist of monomers which can be anionically polymerized with alkyl lithium initiators. They are for example all the aromatic vinyl compounds such as styrene, alpha-methylstyrene, vinyltoluene and monomers thereof, vinyl-unsaturated amides such as N,N-dialkylamides, for example N,N-dimethylacrylamide, and also acrylonitrile, methacrylonitrile, lower alkyl and allyl acrylates and methacrylates, including methyl and t-butyl acrylate and methacrylate, vinylpyridines, dienes and the like. For the purposes of the present invention, "lower" as used herein refers to organic groups which contain 8 or fewer carbon atoms per molecule. The preferred aromatic vinyl compounds contain 8–12 carbon atoms. Very particular preference is given to styrene and its ring- or alpha-alkyl-substituted derivatives, and also to butadiene, isoprene and 2,3-dimethylbutadiene.

Anionic polymerization with organic compounds of alkali metals is so well known as a process as to require no further discussion here (cf. for example GB Pat. No. 1,444,680 or J. Appl. Polym. Sci. 22 [1978], 2907–2913).

The number average molecular weight of the polymer according to the invention ranges from 300 to 500,000, preferably from 1,000 to 180,000. Suitable capping agents for introducing the aminic end groups include, inter alia, Schiff bases and similar compounds, diaziridines and all those compounds proposed in detail in EP-A-No. 211,395 and U.S. Ser. No. 030,487. Suitable compounds include those of the formula

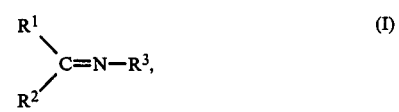

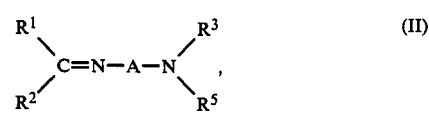

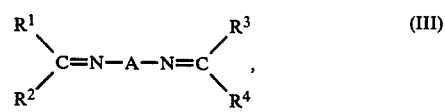

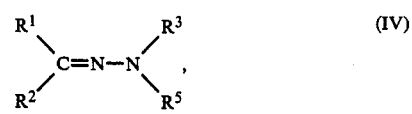

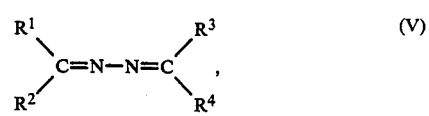

wherein $R^1$ and $R^2$ are each H, alkyl, cycloalkyl or aryl, $R^2$, $R^3$ and $R^5$ are each alkyl, cycloalkyl or aryl and A is a substituted or unsubstituted bridge which, in addition to the C members, can also contain N or O members and

and

where $R^6$ and $R^7$ are each alkyl or aryl, A is a single-membered substituted or unsubstituted carbon bridge and B is a 2- to 12-membered bridge of which at least those members adjacent to the nitrogen atom comprise —C($R^8$, $R^9$) radicals, where $R^8$ and $R^9$ can be identical or different and are H, alkyl, cycloalkyl or aryl, and the non-adjacent members can be not only —C($R^8$, $R^9$) radicals but also ethyl or N-alkyl or N-aryl-imino groups. The compounds (I) to (VII) recited in claim 1 are known per se. The principle of preparing said compounds (I) to (V) is described for example in Methoden der org. Chemie (Houben-Weyl), volume VII/1 (4th edition) (1954), pages 455 et seq. and 461 et seq., volume XI/2 (4th edition) (1958), pages 77 et seq., volume X/2 (4th edition) (1967), pages 89 et seq., and compounds (VI) and (VII) are described by R. Ohme et al. in Chem. Ber. 99 (1966), 2104–2109 and E. Schmitz and K. Schinkovsky in Chem. Ber. 97 (1964), 49. The reaction of the compounds (I) to (VII) with the living polymer is in general carried out in the presence of an inert polar or apolar solvent, preferably in the absence of water and in an inert atmosphere. Particularly highly suitable capping agents for the process according to the invention are bicyclic diaziridines such as 1,5-diazabicyclo[3.1.0-]hexane and alkyl derivatives thereof. In the subsequent terminating step they also make possible the introduction of a plurality of polymerizable end groups.

After the capping reaction the capped macromolecular chains are reacted with the terminating agent. Suitable for this purpose are halogen compounds or monocarboxylic or dicarboxylic anhydrides which also contain a polymerizable end group, for example an olefin group or an oxirane or thiirane group. Useful halogen-containing terminating agents include: vinyl haloalkyl ethers where the alkyl group contains 6 or fewer carbon atoms, such as methyl, hexyl and isomers thereof; vinyl esters of haloalkylcarboxylic acids where the alkyl group contains 6 or fewer carbon atoms, such as acetic acid, propionic acid, butanoic to hexanecarboxylic acid; further olefin halides of 6 or fewer carbon atoms, such as vinyl halide, allyl, methallyl, 6-halo-1-hexene and the like; further halides of dienes such as 2-halomethyl-1,3-butadiene, epihalohydrins, haloalkylmaleic anhydrides and esters thereof, vinylhaloalkylsilanes; further vinylhaloalkylaryls such as vinylbenzyl chloride. The halogen can be chlorine, bromine, iodine or fluorine, but preferably is chlorine.

Particularly useful halogenating compounds for the terminating reaction are chloromethylstyrenes, such as the o-, m- or p-derivative and mixtures thereof, acryloyl or methacryloyl chloride, and also epichlorohydrin.

Suitable monocarboxylic or dicarboxylic anhydride terminating agents are for example acrylic anhydride, methacrylic anhydride, anhydrides of haloalkylcarboxylic acids where the alkyl contains 6 or fewer carbon atoms, for example haloacetic anhydride, alpha- or β-halopropionic anhydride to halohexanecarboxylic anhydride, and also maleic anhydride and alkylated derivatives thereof, and moreover 2-methylenesuccinic anhydride and butadiene-2,3-dicarboxylic anhydride.

The ratio of terminating agent:lithium initiator should be greater than one. However, an excess by a factor of more than 10 is not sensible since it does nothing to raise the yield any further and frequently needs to be removed after the reaction. In general, a ratio of from 1:1 to 1:5, preferably from 1:1.1 to 1:3, is sufficient. The macromolecular monomer can be separated from the solvent used in the synthesis in a conventional manner, such as precipitation with nonsolvents, evaporation of the solvent in evaporators or degassing means such as extruders, or by steam distillation. The isolation of the macro-molecular polymer does not form part of the subject-matter of the invention. If, for example, a copolymerization of the macro-molecular monomer according to the invention with a monomer is intended, the macromolecular monomer need not be isolated. The second monomer is simply added to the solution and the copolymerization is carried out in the same solvent in which the macromolecular monomer was prepared.

The concentration in the solvent in the preparation of the macromolecular monomer can vary within wide limits. The only technical constraint is the need to dissipate the heat of reaction and to guarantee adequate mixing of the viscous solution which is formed in the course of the polymerization. In general, the concentration chosen is for these reasons from 5 to 35% by weight of solids.

Suitable solvents include, inter alia, aliphatic, cycloaliphatic and aromatic hydrocarbons such as n-hexane, n-heptane, cyclohexane, toluene and the like.

However, it is also possible to use other inert solvents such as tetrahydrofuran, diethyl ether and the like.

The polymerization temperature depends on the monomer, but in general the polymerization is carried out at from $-100°$ C. to $+-100°$ C., preferably at from $-10°$ C. to $+90°$ C.

The capping reaction and the terminating reaction are in general carried out at from $-10°$ C. to $70°$ C., preferably from $0°$ C. to $50°$ C. Any lower and the reaction is very slow, any higher and there is a very substantial increase in undesirable secondary reactions.

Suitable alkyl lithium compounds for use as polymerization initiators are for example n-butyl lithium and sec.-butyl lithium as supplied by industry. The amount required ranges from 0.1 to 200 mmol of catalyst per mol of monomer, depending on the desired molecular weight.

It is also possible to use dilithium compounds as catalysts, in which case the polymerizable end groups form at both ends of the chain.

The macromolecular monomers prepared as described in the present invention can be copolymerized with other monomers in a conventional manner, for example by using free radical, anionic or cationic initiators, as long as they are suitable for the particular end group on the macromolecular monomer and for the monomer used.

Epoxy-terminated macromolecular monomers can for example copolymerize with tetrahydrofuran after cationic initiation. Similarly, chloromethylstyrene-terminated macromolecular monomers can copolymerize with for example styrene, acrylonitrile, methyl methacrylate or acrylates, or even mixtures of these or similar monomers, after free radical initiation. The resulting graft copolymers can contain from 1 to 95% by weight of the macromolecular monomer and from 99 to 5% by weight of comonomer. The possible ways of performing such copolymerizations are for example described in detail in U.S. Pat. No. 3,786,116.

The invention is illustrated in more detail by the Examples below without, however, being limited thereby.

Starting materials and solvents are each purified in the usual manner for use in anionic polymerization.

EXAMPLE 1

Preparation of an epoxy-terminated polystyrene of molecular weight 5,000

(a) Preparation of a propylenediaziridine-capped polymer

A 2-liter, three-necked flask which is equipped with stirrer, thermometer and a rubber septum stopper and is rinsed out under pure nitrogen with a solution of sec.-butyl lithium in cyclohexane is charged with 1000 cm³ of cyclohexane and 104 g (1 mol) of purified styrene.

At 50° C. a hypodermic syringe is then used to add a 1.4 M solution of sec.-butyl lithium in cyclohexane to the thoroughly stirred styrene solution until a slightly orange color persists. At once a further 21 mmol of sec.butyl lithium are added. The now deeply orange solution starts to heat up. The polymerization is complete after an hour at 70° C. The solution is titrated at 40° C. with a 50% strength by weight solution of 1,5-diazabicyclo[3.1.0]hexane in toluene introduced through the rubber septum stopper by means of a hypodermic syringe. After 3.7 cm³ have been added, the orange color disappears, and the 1,5-diazabicyclo[3.1.0-]hexane-capped polymer has formed. Potentiometric titration with perchloric acid in a mixture of chlorobenzene/glacial acetic acid on a sample purified by precipitation with an alcohol, dissolving in toluene and renewed precipitation with an alcohol reveals a base nitrogen content of 0.57% by weight. Total nitrogen by Kjeldahl: 0.59% by weight.

Molecular weight (MW) by gel permeation chromatography (GPC)=5100, Mw/Mn=1.07.

(b) Termination 65 mmol of epichlorohydrin are added at 40° C. to the solution obtained as per (a). After an hour the cyclohexane is evaporated in a water bath, in the end under reduced pressure. Cooling down leaves a glassy foamy melt.

EXAMPLE 2

Cationic copolymerization of the polymer of Example 1 with tetrahydrofuran (THF).

The residue of Example 1 is dissolved in 1.5 l of tetrahydrofuran. After cooling down to 0° C., 2.5 g of propylene oxide and 100 mmol of boron trifluoride etherate are added to effect cationic copolymerization.

The reaction mixture formed in the course of 6 hours contains, according to GPC, 75% by weight of the polystyrene macromonomer as a copolymer with THF in a styrene/THF composition of 32/68 (area percent).

EXAMPLE 3

Preparation of a vinylphenyl-terminated 2-block copolymer comprising 17% by weight of styrene and 83% by weight of butadiene and having a molecular weight of 55,000

(a) Preparation of an amine-terminated block copolymer

To prepare a 2-block copolymer comprising 17% by weight of styrene and 83% by weight of butadiene and having diamino end groups, a 6-liter reactor which is equipped with stirrer, thermometer, reflux condenser, rubber septum stopper and heating jacket is cleaned out by boiling under pure nitrogen with cyclohexane containing 2 cm³ of sec-butyl lithium. After this solution has been discharged, the reactor is charged with 3000 cm³ of cyclohexane and 0.9 mol=93.6 g of styrene. Using a hypodermic syringe a solution of sec.-butyl lithium is metered in at 40° C. until a slightly orange color indicates that all impurities have been consumed. 12 mmol of sec.-butyl lithium are then added, and the styrene is fully polymerized at 65° C. in the course of an hour. 10.2 mmol of butadiene which has been purified by distillative removal of butyl lithium are then added at that temperature a little at a time. One hour after the addition has ended, 2 cm³ of styrene are added by means of a syringe. The solution, which is almost colorless during the polymerization of butadiene, turns orange after a further hour at 65° C. By GPC the weight average molecular weight M$_W$ is found to be 55,000. The solution is titrated with 1,5-diazabicyclo[3.1.0]hexane (50% strength by weight solution in toluene) from a calibrated hypodermic syringe to a colorless end point. 1.85 cm³ (=11 mmol or 0.924 g) of the solution are required. The nitrogen content by Kjeldahl is 0.047% by weight (theory 0.05% by weight).

(b) Termination with chloromethylstyrene

The solution as per (a) is treated at 40° C. with 30 mmol of chloromethylstyrene. After an hour the temperature is raised to 60° C. After a further hour the polymer is precipitated by pouring the solution with thorough stirring into 10 l of ethanol. The polymer is separated off and dried overnight at 50° C. and 10 mbar in a drying cabinet. 600 g of a clear, plastic polymer cake are obtained.

EXAMPLE 4

Thermal copolymerization of the polymer of Example 3 with styrene.

100 g of the copolymer of Example 3 are dissolved in 400 g of monostyrene and polymerized under nitrogen in a stirrer-equipped 2 liter glass flask in an oil bath in accordance with the following temperature program.

4 hours 80° C.
2 hours 90° C.
4 hours 100° C.

The stirrer is pulled out of the highly viscous melt after 6 hours.

After the polymerization has ended, the melt is cooled down and the flask is shattered. The high-impact polystyrene which has formed is ground, and unconverted styrene is removed at 1 mbar at 50° C. in a vacuum drying cabinet.

Styrene conversion 91%

The polymer is characterized by GPC. 92% by weight of the vinylphenyl-terminated block copolymer have been incorporated in the polymer.

EXAMPLE 5

Preparation of an acrylic acid terminated polyisoprene of molecular weight 6,000

In an apparatus as described in Example 3, 540 g of isoprene (purified over Ca hydride) is polymerized with about 80 mmol of sec.-butyl lithium in 3000 cm³ of cyclohexane. After the polymerization has ended, 2 cm³ of styrene are added. After a further hour the solution is titrated at 40° C. with 17 cm³ of a 50% strength by weight 1,5-diazabicyclo[3.1.0]hexane solution to a colorless end point.

M$_W$ molecular weight of polyisoprene from GPC (measured before capping): 6,000. Nitrogen content by Kjeldahl: 0.5% by weight (theory 0.4% by weight).

The polymer solution is reacted at 40° C. with 0.1 mol of acryloyl chloride. After an hour the solution is poured with thorough stirring into 6 l of ethanol. The precipitated oil is separated off and washed by stirring twice with 2 l of ethanol each time, in the end in the presence of 10 g of di-t-butyl-p-cresol. The oil is freed from the last traces of solvent by drying overnight at 50° C. and 10 mbar in a drying cabinet. Yield: 550 g. The polymer has a hydrolysis number of 9.

Free radical copolymerization of the acrylic acid terminated polyisoprene of MW 6,000 with n-butyl acrylate 50 g of the polymer of Example 5 are dissolved in a 2 liter flask in 750 cm³ of cyclohexane by stirring.

After 150 g of n-butyl acrylate and 0.56 g of azobisisobutyronitrile are added, and the solution is polymerized at 60° C. under nitrogen by stirring for 15 hours.

The result is an opalescent solution of graft copolymer of polyisoprene and polybutyl acrylate. GPC shows that about 90% by weight of the macromolecular monomer present at the beginning has been incorporated in the graft copolymer.

EXAMPLE 7

Preparation of a maleic anhydride terminated polystyrene of MW 6,000

First a propylene diaziridine-capped polystyrene is prepared as described in Example 1a, except that only 17 mmol of sec.-butyl lithium are used. GPC reveals an MW of 6,000. The termination with 1,5-diazabicyclo[3.1.0]hexane is complete after the addition of 19 mmol (solution becomes colorless). A warm solution of 2.1 g of maleic anhydride and 30 cm$^3$ of toluene is then added. After 1 hour at 40° C. the solution is poured with thorough stirring into 5 liters of alcohol containing 2 cm$^3$ of glacial acetic acid. The finely pulverulent polymeric macromonomer is filtered off with suction, washed neutral with methanol and dried overnight at 50° C. in a vacuum drying cabinet.

Nitrogen content by Kjeldahl: 0.48%. Acid number: 9.5.

The macromolecular monomer thus prepared is incorporated to about 90% by weight as a graft copolymer on free radical copolymerization with methyl acrylate or styrene.

I claim:

1. A process for preparing a terminally functionalized polymer from a living polymer obtained by anionic polymerization of an olefinically unsaturated monomer, which comprises first reacting the living polymer with a capping agent comprising a nitrogen compound of the formula VII

where A is a single membered substituted carbon bridge and B is a 2-to 12-membered bridge of which at least those membes adjacent to the nitrogen atom comprise —C(R$^8$, R$^9$) radicals, where R$^8$ and R$^9$ can be identical or different and are H, akyl, cycloalkyl or aryl, and the non-adjacent members can be not only —C(R$^8$, R$^9$) radicals but also ethyl or N-alkyl- or N-aryl-imino groups, and the polymer obtained is then made to react with a terminating agent selected from the group consisting of chloromethylstyrene, acryloyl or methacryloyl chloride, epichlorohydrin, acrylic anhydride, methacrylic anhydride and maleic anhydride.

2. A process as defined in claim 1, wherein the capping agent used is a compound from the class of 1,5-diazabicyclo[3,1,0]hexane and alkyl-substituted derivatives thereof.

3. A terminally functionalized polymer prepared by the process of claim 1.

* * * * *